United States Patent
Mori

(10) Patent No.: US 8,305,618 B2
(45) Date of Patent: Nov. 6, 2012

(54) IMAGE FORMING APPARATUS, ACTIVATION CONTROL METHOD

(75) Inventor: Yujin Mori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 682 days.

(21) Appl. No.: 12/553,291

(22) Filed: Sep. 3, 2009

(65) Prior Publication Data

US 2010/0067033 A1  Mar. 18, 2010

(30) Foreign Application Priority Data

Sep. 16, 2008 (JP) .................................. 2008-237124

(51) Int. Cl.
*G06F 3/12* (2006.01)
*G06K 15/00* (2006.01)
(52) U.S. Cl. ...................... 358/1.15; 358/1.13; 358/1.14
(58) Field of Classification Search .......................... None
See application file for complete search history.

(56) References Cited

U.S. PATENT DOCUMENTS

| | | | |
|---|---|---|---|
| 2004/0187042 A1* | 9/2004 | Kawanabe | 713/300 |
| 2007/0122174 A1* | 5/2007 | Yamamoto | 399/88 |
| 2008/0231878 A1 | 9/2008 | Yano et al. | |
| 2008/0310874 A1* | 12/2008 | Mori | 399/77 |
| 2011/0172843 A1* | 7/2011 | Wu et al. | 700/293 |

FOREIGN PATENT DOCUMENTS

| | | |
|---|---|---|
| JP | 9-244509 | 9/1997 |
| JP | 2004-326610 | 11/2004 |
| JP | 2005-227502 | 8/2005 |
| JP | 2007-301765 | 11/2007 |

* cited by examiner

*Primary Examiner* — Dov Popovici
(74) *Attorney, Agent, or Firm* — Oblon, Spivak, McClelland, Maier & Neustadt, L.L.P.

(57) ABSTRACT

An image forming apparatus activates target devices including connected devices and internal devices, and executes a requested process. The image forming apparatus includes an acquiring unit configured to acquire information pertaining to the connected devices, information pertaining to a startup method of the image forming apparatus, and information pertaining to maximum usable power of a power supply unit of the image forming apparatus; a specifying unit configured to verify what the target devices are and specify a corresponding activation pattern based on the information acquired by the acquiring unit, wherein the corresponding activation pattern is specified among plural activation patterns that have been set in advance, each of the plural activation patterns defining activation timings of the target devices; and an activation control unit configured to control activation of the target devices in accordance with the corresponding activation pattern specified by the specifying unit.

9 Claims, 12 Drawing Sheets

FIG.4

| ACTIVATION PATTERN | CLASSIFICATION OF MAXIMUM USABLE POWER | CONNECTED DEVICE CONFIGURATION | | | SCANNING UNIT (SCANNING SYSTEM) | IMAGE FORMING UNIT (IMAGE FORMING SYSTEM) | FIXING UNIT |
|---|---|---|---|---|---|---|---|
| | | DEVICE 1 | DEVICE 2 | DEVICE 3 | | | |
| NORMAL 1 | $P_1$ | × | × | × | TRIGGER 0 | TRIGGER 0 | TRIGGER 0 |
| TYPE A1 | $P_1$ | TRIGGER 1 | × | × | TRIGGER 0 | TRIGGER 0 | TRIGGER 0 |
| TYPE B1 | $P_1$ | TRIGGER 1 | TRIGGER 2 | × | TRIGGER 0 | TRIGGER 0 | TRIGGER 0 |
| TYPE B2 | $P_1$ | TRIGGER 1 | TRIGGER 2 | × | TRIGGER 0 | TRIGGER 1 | TRIGGER 0 |
| TYPE B3 | $P_1$ | TRIGGER 1 | △ | × | TRIGGER 0 | TRIGGER 0 | TRIGGER 0 |
| TYPE C1 | $P_1$ | TRIGGER 1 | × | TRIGGER 3 | TRIGGER 0 | TRIGGER 0 | TRIGGER 0 |
| TYPE C2 | $P_1$ | TRIGGER 1 | × | TRIGGER 0 | TRIGGER 0 | TRIGGER 1 | TRIGGER 0 |
| TYPE D1 | $P_1$ | TRIGGER 1 | TRIGGER 2 | TRIGGER 3 | TRIGGER 0 | TRIGGER 0 | TRIGGER 0 |
| TYPE D2 | $P_1$ | TRIGGER 1 | △ | TRIGGER 3 | TRIGGER 0 | TRIGGER 0 | TRIGGER 0 |
| NORMAL 2 | $P_2$ | × | × | × | TRIGGER 0 | TRIGGER 0 | TRIGGER 0 |
| TYPE A2 | $P_2$ | TRIGGER 0 | × | × | TRIGGER 0 | TRIGGER 0 | TRIGGER 0 |

71

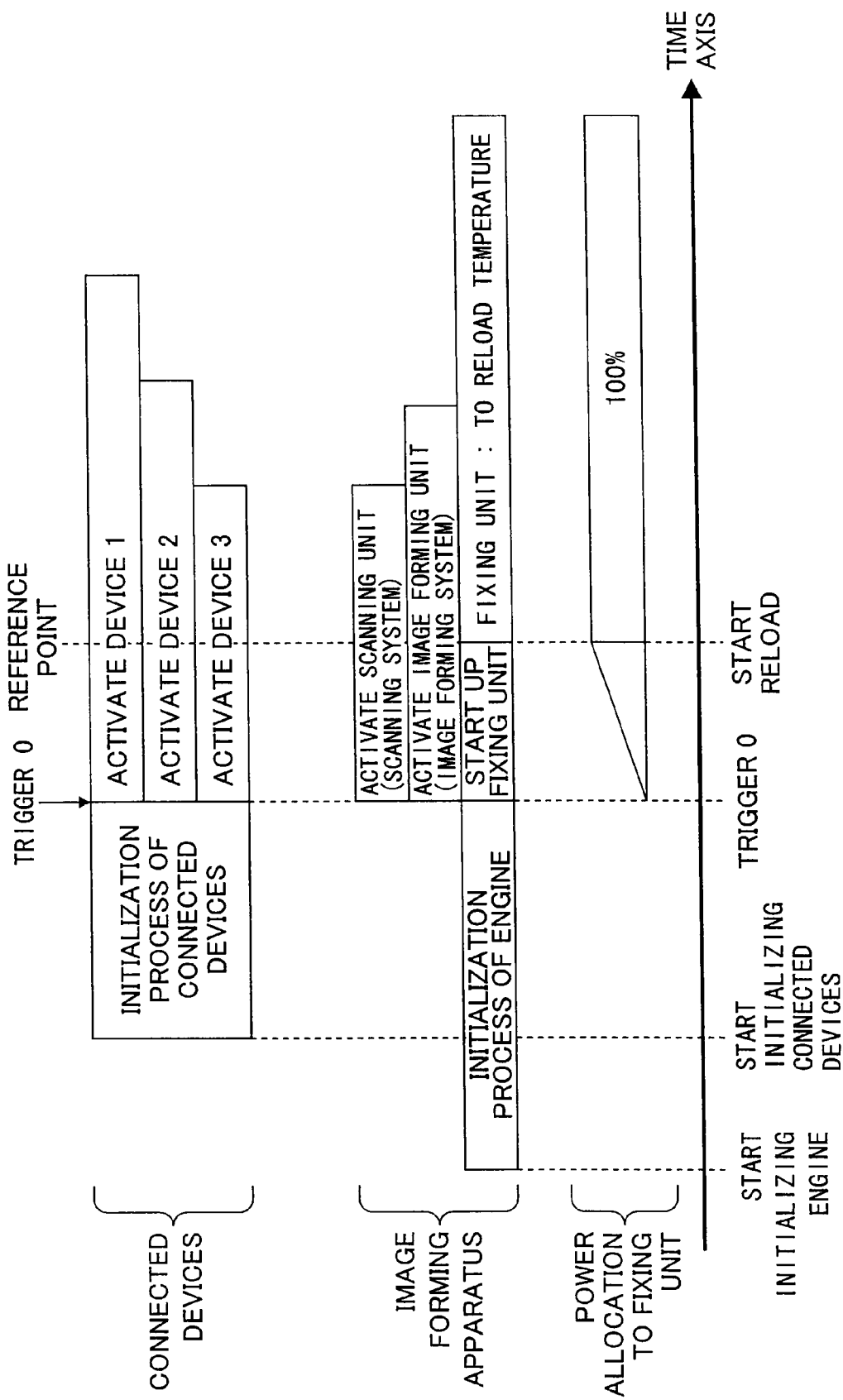

IMAGE FORMING APPARATUS, ACTIVATION CONTROL METHOD

BACKGROUND OF THE INVENTION

1. Field of the Invention

The present invention relates to an image forming apparatus, and more particularly to a technology for controlling the activation of devices connected to the image forming apparatus and/or devices installed in the image forming apparatus (internal devices).

2. Description of the Related Art

In recent years, image forming apparatuses typically referred to as Multi Function Peripherals (MFP) have become commonplace. In the MFP, multiple functions such as those of a printer, a copier, a fax machine, and a scanner are stored in a single body. In the MFP, a display unit, a printing unit, and an image forming unit are provided in a single body. Furthermore, software corresponding to a printer, a copier, and a fax machine is installed in the MFP. By switching among these software items, the MFP can operate as a printer, a copier, a fax machine, and a scanner.

When such a conventional MFP is activated by turning on the main power supply, a controller that controls the operation of activating devices (engines) needs to be activated before each of the devices (engines) can be activated. For this reason, the time required for activating the entire MFP depends on the time required for activating the controller.

In the technology proposed in patent document 1, before establishing communications between the controller and the engines, a hard line (information transmission unit) can acquire information indicating whether the image forming apparatus has started up by turning on the main power supply or whether the image forming apparatus has returned from a power-saving mode. Accordingly, the engines can be activated without waiting for the controller to be activated, so that the time required for activating connected devices and/or internal devices can be reduced.

Patent Document 1: Japanese Laid-Open Patent Application No. 2007-301765

However, in the conventional image forming apparatus disclosed in patent document 1, the connected devices and/or the internal devices are activated at the same time. Thus, in some cases, the power consumed when activating the devices may exceed the maximum usable power of the power supply unit.

When the power consumed when activating the devices exceeds the maximum usable power, the power cannot be stably supplied to the devices. As a result, the state of the image forming apparatus becomes unstable.

Accordingly, the image forming apparatus needs to control the process of activating the devices (activation control), so that the power consumed when activating the devices does not exceed the maximum usable power.

When performing activation control, it is necessary to consider the number of connected devices, the connection pattern, and the activating properties of the devices. These factors significantly affect power consumption. Therefore, in order to control the power consumption and the activation standby time (time taken for activation), it is important to adjust the timing of issuing triggers (control signals) for instructing activation of the devices, i.e., the timing of activating the plural devices.

An image forming apparatus is typically provided with one type of power source unit. However, different image forming apparatuses may have various configurations. In one example, the power consumption may not exceed the maximum usable power even when the connected devices, the scanner (scanning device), the image forming unit (image forming device), and the fixing unit are activated at the same time. In this example, the image forming apparatus may be overengineered due to the power supply unit. In the same manner as selecting other devices, it would be preferable to select a power supply unit that supplies an appropriate amount of power in accordance with the configuration of the image forming apparatus (power supply required for stable operations).

SUMMARY OF THE INVENTION

The present invention provides an image forming apparatus and an activation control method, in which one or more of the above-described disadvantages are eliminated.

A preferred embodiment of the present invention provides an image forming apparatus and an activation control method with which the configuration of the power unit can be changed, and connected devices and/or internal devices can be activated with an optimum level of power consumption and an optimum amount of time taken for activating the devices.

According to an aspect of the present invention, there is provided an image forming apparatus for activating target devices including at least one of connected devices that are connected to the image forming apparatus and internal devices that are installed in the image forming apparatus, and for executing a requested process, the image forming apparatus including an acquiring unit configured to acquire information including an information item pertaining to the connected devices, an information item pertaining to a startup method of the image forming apparatus, and an information item pertaining to maximum usable power of a power supply unit of the image forming apparatus; a specifying unit configured to verify what the target devices are and specify a corresponding activation pattern based on the information acquired by the acquiring unit, wherein the corresponding activation pattern is specified among plural activation patterns that have been set in advance, each of the plural activation patterns defining activation timings of the target devices; and an activation control unit configured to control activation of the target devices in accordance with the corresponding activation pattern specified by the specifying unit.

According to an aspect of the present invention, there is provided an activation control method performed by an image forming apparatus for activating target devices including at least one of connected devices that are connected to the image forming apparatus and internal devices that are installed in the image forming apparatus, and for executing a requested process, the activation control method including an acquiring step of acquiring information including an information item pertaining to the connected devices, an information item pertaining to a startup method of the image forming apparatus, and an information item pertaining to maximum usable power of a power supply unit of the image forming apparatus; a specifying step of verifying what the target devices are and specifying a corresponding activation pattern based on the information acquired at the acquiring step, wherein the corresponding activation pattern is specified among plural activation patterns that have been set in advance, each of the plural activation patterns defining activation timings of the target devices; and an activation control step of controlling activation of the target devices in accordance with the corresponding activation pattern specified at the specifying step.

According to one embodiment of the present invention, an image forming apparatus and an activation control method are provided, with which the configuration of the power supply unit can be changed, and devices connected to the image forming apparatus and/or devices installed in the image forming apparatus can be activated by consuming the optimum amount of power and taking the optimum amount of activation time (time taken for activation).

BRIEF DESCRIPTION OF THE DRAWINGS

Other objects, features and advantages of the present invention will become more apparent from the following detailed description when read in conjunction with the accompanying drawings, in which:

FIG. 4 illustrates an example of data of activation timing information according to an embodiment of the present invention;

FIG. 5 illustrates an example (part 1) of activating the devices connected to the image forming apparatus according to an embodiment of the present invention;

DETAILED DESCRIPTION OF THE PREFERRED EMBODIMENTS

A description is given, with reference to the accompanying drawings, of embodiments of the present invention.
<Configuration>

Figure 1:
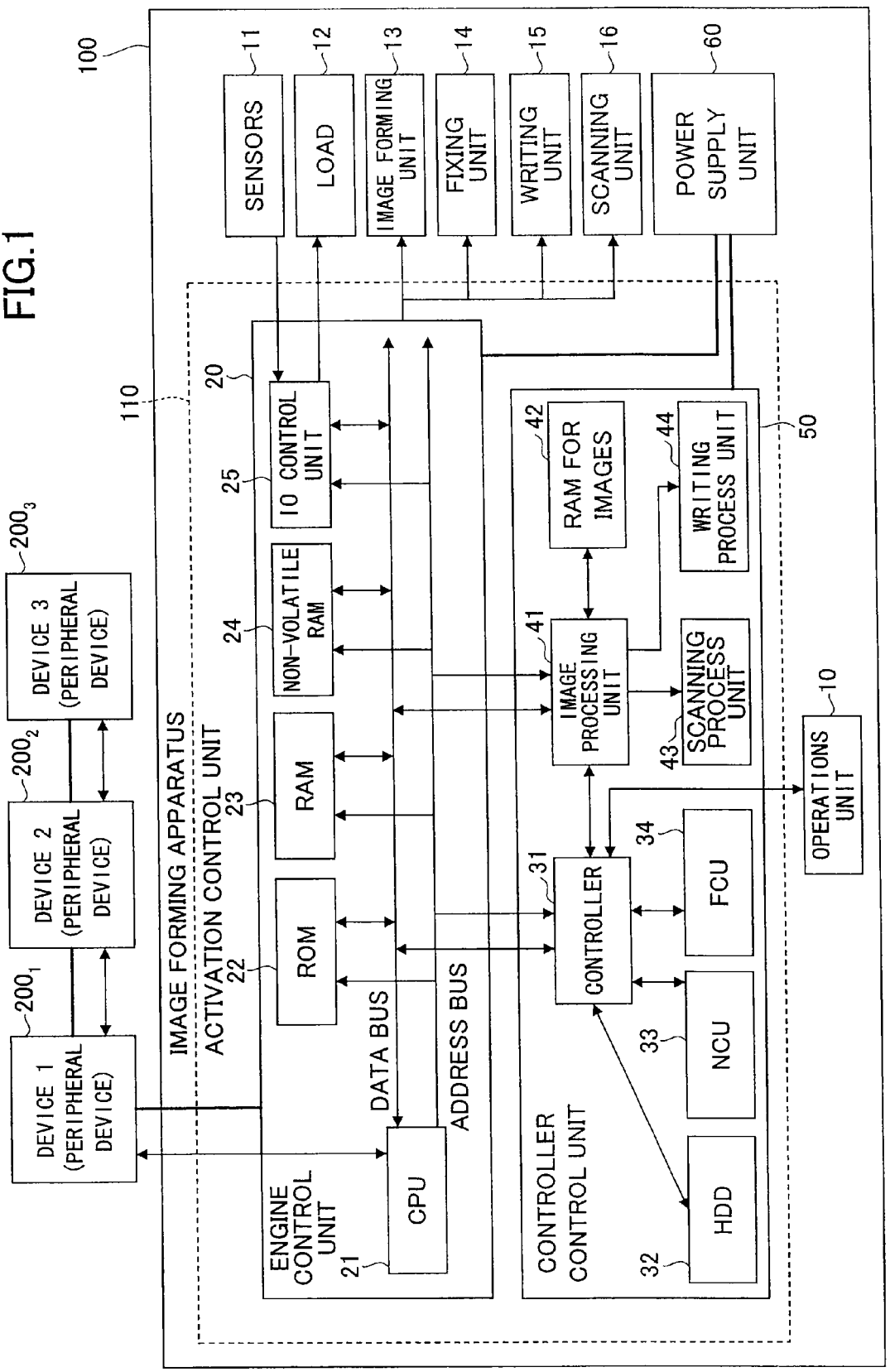
FIG. 1 illustrates a configuration (part 1) of an image forming apparatus according to an embodiment of the present invention.

A description is given of a configuration of an image forming apparatus according to an embodiment of the present invention. FIG. 1 illustrates a configuration (part 1) of an image forming apparatus 100 according to an embodiment of the present invention. As shown in FIG. 1, the image forming apparatus 100 includes an operations unit 10, sensors 11, a load 12, an image forming unit 13, a fixing unit 14, a writing unit 15, a scanning unit 16, and an activation control unit 110.

The operations unit 10 is a user interface for receiving operations of various switches and inputs to various operation screen pages. For example, the operations unit 10 receives an operation of a switch to turn on/off the main power supply, or a button being clicked to instruct a printing job or a fax transmission job.

The sensors 11 are various sensors in the image forming apparatus 100, such as a conveying path sensor for detecting abnormalities in the conveying path, a unit connection detecting sensor for detecting the unit connection state, and a door sensor for detecting whether the door is open/closed.

The load 12 collectively refers to motors and solenoids that are control targets to be controlled by an IO control unit 25 described below, in accordance with inputs to the sensors 11.

The image forming unit 13 is for forming images on a photoconductive drum which is an image carrier. The image forming unit 13 includes the photoconductive drum, a charging unit, a developing unit, a transfer unit, and a separating unit.

The fixing unit 14 is for fixing the image formed by the image forming unit 13 on a recording sheet. The fixing unit 14 includes a fixing roller and a pressurizing roller.

The writing unit 15 is for generating light to be radiated on the photoconductive drum in the image forming unit 13. The writing unit 15 includes a light emitting device and a polygon motor.

The image forming unit 13, the fixing unit 14, the writing unit 15, and the scanning unit 16 correspond to an engine controlled by an engine control unit 20 described below. The engine is not limited to the image forming unit 13, the fixing unit 14, the writing unit 15, and the scanning unit 16; the engine may be any device used for forming images, such as a fax unit (not shown).

((Activation Control Unit))

The activation control unit 110 is for controlling the process of activating the engine that performs mechanical operations pertaining to image processing procedures of the image forming unit 13 and the fixing unit 14. The activation control unit 110 includes the engine control unit 20 and a controller control unit 50.

The elements of the activation control unit 110 may be provided on a single substrate, or may be provided on plural substrates. For example, a Central Processing Unit (CPU) 21 and a controller 31 may be separate processors that are provided on different substrates.

(Engine Control Unit)

The engine control unit 20 is for controlling the engine that performs mechanical operations pertaining to image processing procedures of the image forming unit 13 and the fixing unit 14. The engine control unit 20 includes the CPU 21, a Read Only Memory (ROM) 22, a RAM 23, a non-volatile RAM 24, and the IO control unit 25.

The CPU 21 is a processor for executing an engine control process performed by the engine control unit 20. The ROM 22 is for storing programs for causing the CPU 21 to operate. The RAM 23 is for temporarily storing data used by programs. The non-volatile RAM 24 is for storing adjustment values used for controlling operations and timings, as well as setting values pertaining to the registered copy mode. The IO control unit 25 is for controlling the load 12 based on input to the sensors 11.

(Controller Control Unit)

The controller control unit 50 includes the controller 31, a Hard Disk Drive (HDD) 32, a Network Control Unit (NCU) 33, a fax Control Unit (FCU) 34, an image processing unit 41, a RAM for images 42, a scanning process unit 43, and a writing process unit 44.

The controller 31 is for controlling the entire image forming apparatus 100, image rendering processes, communications, and inputs from the operations unit 10. The controller 31 controls various processes pertaining to image processing procedures by implementing communications established between the controller 31 and the engine control unit 20.

When the main power supply of the image forming apparatus 100 is turned on, the initialization processes of both the engine control unit 20 and the controller 31 are performed. When these initialization processes are completed, the image forming apparatus 100 is ready for performing image forming processes such as copying processes. The initialization process includes a process of establishing communications via a bus (data bus, address bus) between the controller 31 and the CPU 21. After the communications are established, the controller 31 and the CPU 21 can perform control processes by implementing various commands such as an engine activation request command.

The HDD 32 is a storage device for storing image data, programs, font data, and forms.

The NCU 33 is for performing communications with external devices (not shown). The FCU 34 is for performing a fax sending/receiving process via a public line. For example, when a print request is received from an external device, or when a fax message is received, the NCU 33 converts the image data received by the controller 31 into printing data, temporarily stores the printing data in the HDD 32, and sends the printing data to the writing process unit 44 via the image processing unit 41 to output the image data.

The image processing unit 41 is for performing a process on the image data obtained by a scanning process. Specifically, the image processing unit 41 performs a modulation transfer function (MTF) correction, a zooming process, or image quality correction in accordance with the process mode set at the operations unit 10. Then, the image processing unit 41 stores the image data in the RAM for images 42, and also stores the image data in the HDD 32 via the controller 31.

When an electronic sorting function is used for taking plural copies, the image processing unit 41 copies the image data from the HDD 32 into the RAM for images 42 for taking second and subsequent copies. The image processing unit 41 uses the image data copied into the RAM for images 42 to perform the copying operations for implementing the electronic sorting function. The saved image data may also be used for a recovery operation in the event that a paper jam occurs.

The engine control unit 20 and the controller 31 are connected via the image processing unit 41. While image processing procedures are performed, the engine control unit 20 and the controller 31 not only exchange image data, but also exchange control signals and status signals via the image processing unit 41.

The RAM for images 42 is a storage unit for storing image data that is the target of the image processing procedures performed by the image processing unit 41.

The scanning process unit 43 is for performing a process of reading image data obtained by a scanning process of the scanning unit 16. The writing process unit 44 performs a writing process at a time when a sheet is fed.

((Power Supply Unit))

A power supply unit 60 is for supplying power to the above-described functional units provided in the image forming apparatus 100. The maximum power supply amount, i.e., the maximum usable power, is specified in the power supply unit 60. If the power supply amount is within the specified power supply amount, stable operations of the functional units can be maintained.

((Relationship Between Image Forming Apparatus and Connected Devices))

The following points are described below.

(A) How the devices are connected to the image forming apparatus 100

Figure 2:
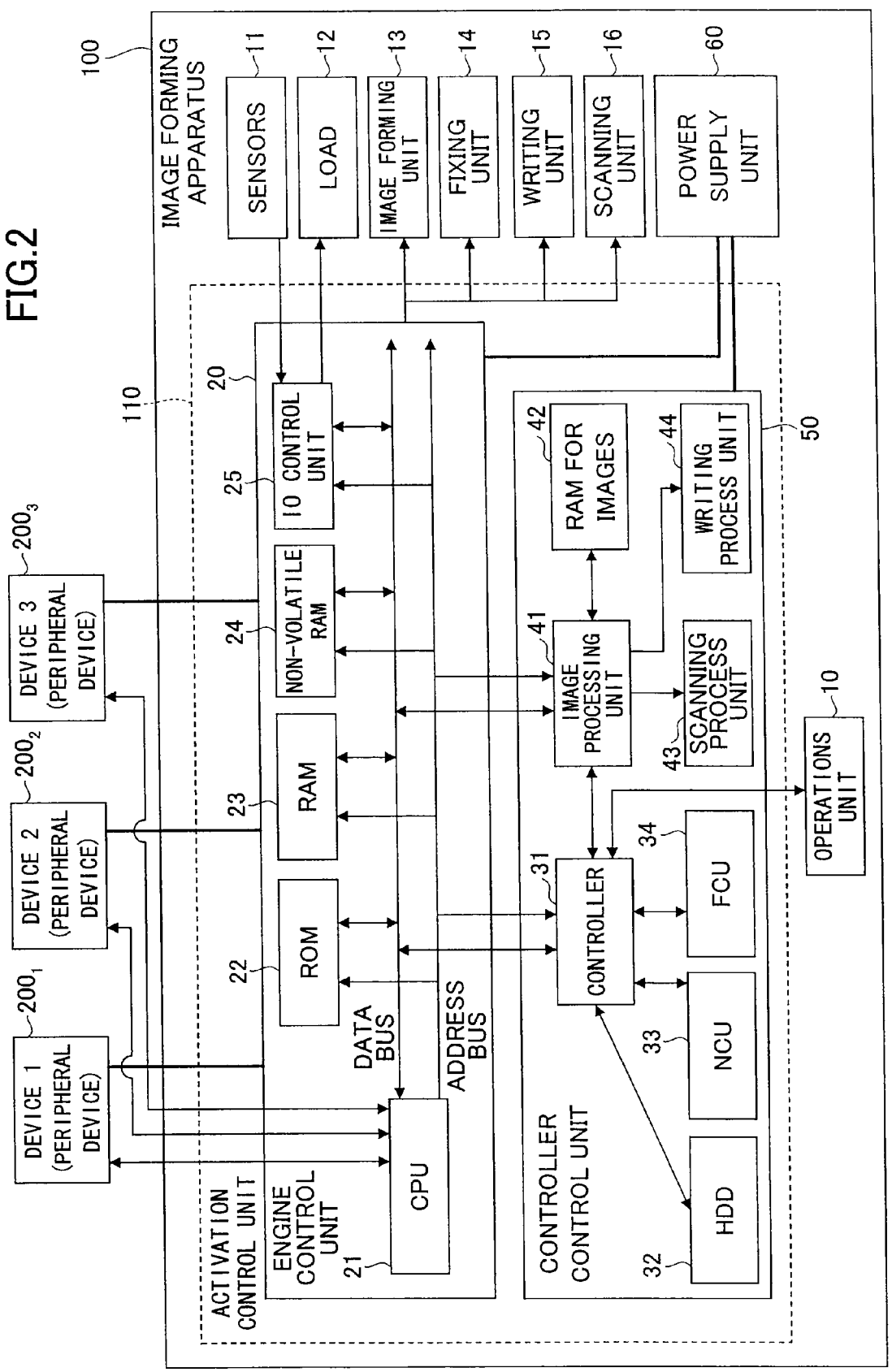
FIG. 2 illustrates a configuration (part 2) of the image forming apparatus according to an embodiment of the present invention.

(B) How the power is supplied from the power supply unit 60 to the connected devices (C) How the connected devices are controlled In the following description, reference is made to FIG. 1 and FIG. 2 illustrating a configuration (part 2) of the image forming apparatus 100.

(A) Connection Pattern

The connection patterns of devices 200 are generally classified into series connection and parallel connection. For example, in FIG. 1, the three devices (device (1) $200_1$ through device (3) $200_3$) are connected in series. In FIG. 2, the three devices (1 through 3) $200_1$ through $200_3$ are connected in parallel.

The devices 200 may be connected to the image forming apparatus 100 by a combination of series connection and parallel connection. For example, the devices (1 and 2) $200_1$ and $200_2$ may be connected in parallel, while the device (3) $200_3$ is connected in series to the device (2) $200_2$.

(B) Power Supplying Method

The power supply unit 60 supplies power to the devices 200 via the engine control unit 20 of the image forming apparatus 100.

When the devices 200 are connected in series as shown in FIG. 1, the power is first supplied from the engine control unit 20 to the device (1) $200_1$ connected to the image forming apparatus 100. Next, the power is sequentially supplied from the device (1) $200_1$ to the device (2) $200_2$, and then from the device $200_2$ (2) to the device (3) $200_3$.

When the devices 200 are connected in parallel as shown in FIG. 2, the power is supplied from the engine control unit 20 to the devices (1 through 3) $200_1$ through $200_3$ connected to the image forming apparatus 100.

As described above, in the case of series connection, the devices 200 are connected to each other. Therefore, the power can be supplied to the device (3) $200_3$ that is connected at the end of the series of devices 200, through the other devices (1 and 2) $200_1$ and $200_2$ connected to the image forming apparatus 100. In the case of parallel connection, each of the devices 200 is connected to the image forming apparatus 100. Therefore, the power can be directly supplied from the image forming apparatus 100 to each of the devices 200.

(C) Device Controlling Method

The devices 200 connected to the image forming apparatus 100 are controlled by the CPU 21 of the engine control unit 20.

When the devices 200 are connected in series as shown in FIG. 1, first, the CPU 21 of the engine control unit 20 controls the operation of activating the device (1) $200_1$. Next, the device (1) $200_1$ controls the operation of activating the device (2) $200_2$ to which it is connected. Then, the device (2) $200_2$ controls the operation of activating the device (3) $200_3$ to which it is connected.

Meanwhile, when the devices 200 are connected in parallel as shown in FIG. 2, the CPU 21 of the engine control unit 20 controls the operation of activating each of the devices (1 through 3) $200_1$ through $200_3$ connected to the image forming apparatus 100.

As described above, in the case of series connection, the devices 200 are connected to each other. Therefore, status notifications and control instructions can be exchanged (bi-directional communication) between the image forming apparatus 100 and the device (3) $200_3$ that is connected at the end of the series of devices 200, through the other devices (1 and 2) 200₁ and 200₂ connected in between the device (3) 200₃ and the image forming apparatus 100. In the case of parallel connection, each of the devices 200 is connected to the image forming apparatus 100. Therefore, status notifications and control instructions can be directly exchanged (bi-directional communication) between the image forming apparatus 100 and each of the devices 200.

<Operation>

A description is given of a process of activating the devices (device activation process) performed by the image forming apparatus 100 according to an embodiment of the present invention.

((Device Activation Process))

Figure 3:
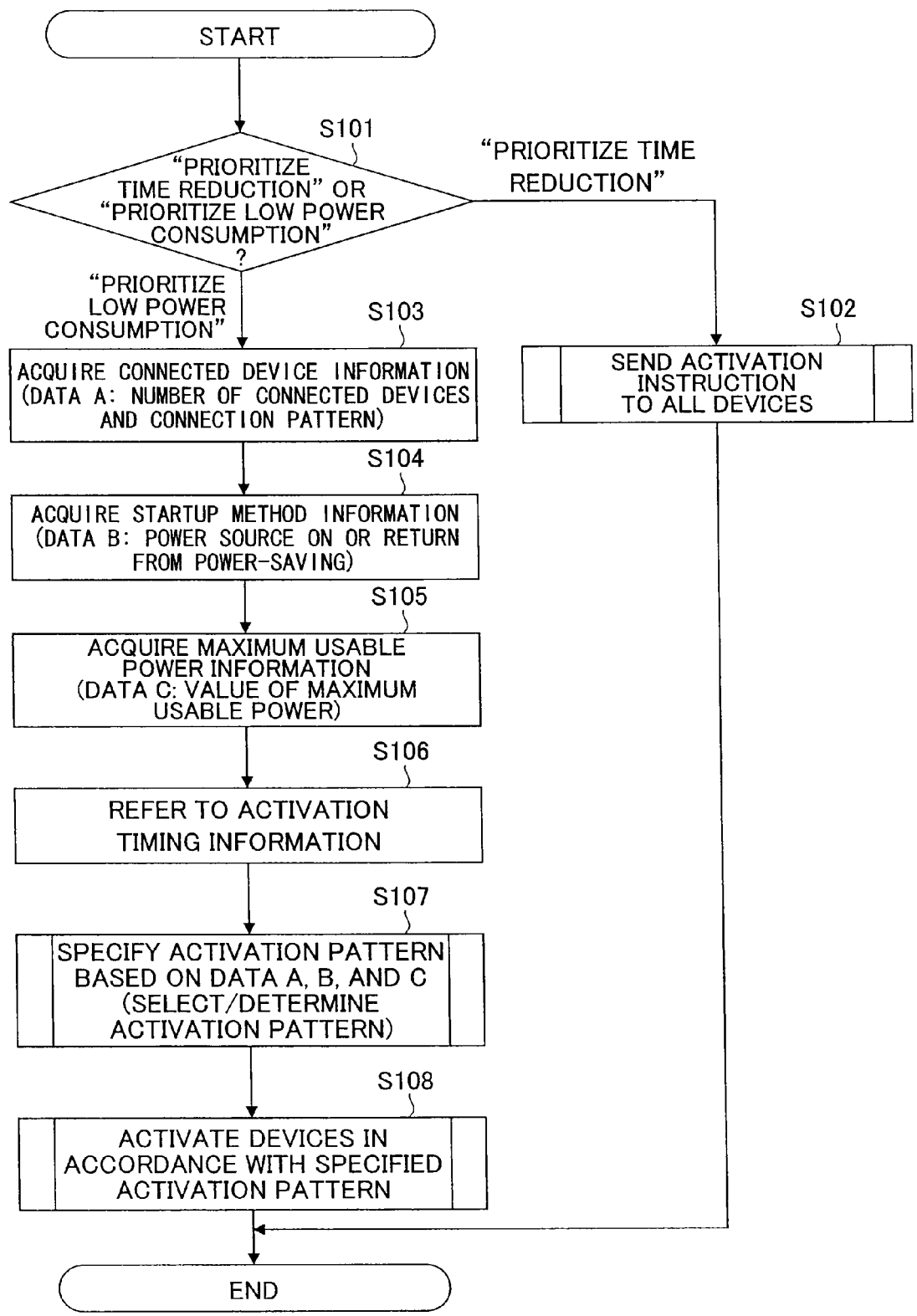
FIG. 3 is a flowchart illustrating the overall flow of a device activation process according to an embodiment of the present invention.

FIG. 3 is a flowchart illustrating the overall flow of the device activation process according to an embodiment of the present invention. Execution of the device activation process is controlled by the CPU 21 in the engine control unit 20.

The CPU 21 in the engine control unit 20 determines whether the type of activation is "prioritize time reduction" or "prioritize low power consumption" (step S101).

A description is given of the types of activation to be determined. "Prioritize time reduction" is an activation method of prioritizing the reduction of time taken for activation (activation time), by prioritizing the reduction of standby time for activation over reduction of power consumption. "Prioritize low power consumption" is an activation method of prioritizing reduction of power consumption over reduction of activation time.

The user or administrator can select whether to prioritize reduction of power consumption or reduction of activation time. Thus, in the present embodiment, a setting screen page, which is used for selecting which type of activation method is to be performed, is displayed on the display panel of the operations unit 10, so that the user or administrator can input a selection (setting unit). The determination of step S101 is made based on the setting of the activation control mode received in this manner.

In step S101, when the CPU 21 determines that the set activation control mode is "prioritize time reduction" ("prioritize time reduction" at step S101), the CPU 21 verifies what the control target devices are (for example, the devices 200 connected to the image forming apparatus 100 and/or the devices installed in the image forming apparatus 100), and sends an activation instruction to all of the devices according to a predefined (set in advance) activation pattern (step S102). Details of the activation control performed at step S102 are described below at <Examples of Operations>.

In step S101, when the CPU 21 determines that the set activation control mode is "prioritize low power consumption" ("prioritize low power consumption" at step S101), information (connected device information) pertaining to the connected devices 200, information (startup method information) pertaining to the startup method of the image forming apparatus 100, and information (maximum usable power information) pertaining to the maximum usable power of the power supply unit 60 are acquired (steps S103 through S105: acquiring unit).

First, the CPU 21 acquires the connected device information (data A) (step S103). The information acquired at this step includes the number of connected devices 200 and the connection pattern (serial connection, parallel connection, or a combination of both). The CPU 21 acquires this information by detecting that the devices 200 are connected to the image forming apparatus 100 via a predetermined interface.

Next, the CPU 21 acquires the startup method information (data B) (step S104). The information acquired at this step includes "power source ON" when the image forming apparatus 100 has started up by turning on the power, or "return from power-saving" when the image forming apparatus 100 has started up by returning from a power-saving mode. The CPU 21 acquires this information indicating either "power source ON" or "return from power-saving", by detecting a trigger at the time of startup.

Next, the CPU 21 acquires the maximum usable power information (data C) (step S105). The information acquired at this step includes a value [W] of the maximum usable power. The CPU 21 acquires the information indicating the maximum usable power from the non-volatile RAM 24.

As described above, in the present embodiment, various information items are acquired, which serve as determination conditions for specifying the activation pattern for performing the activation control in an optimum manner.

The processing procedures of steps S103 through S105 may be performed in any order. Furthermore, the information items (data items A through C) acquired at steps S103 through S105 are temporarily saved in the RAM 23 when they are acquired.

When the information items are acquired, the CPU 21 verifies what the control target devices are (for example, the devices 200 connected to the image forming apparatus 100 and/or the devices installed in the image forming apparatus 100), and acquires definition information (hereinafter, "activation timing information"). In the definition information, the timings for activating the devices (when to issue control signals for instructing activation) and the device configurations (the control target devices such as the devices 200 connected to the image forming apparatus 100 and/or the devices installed in the image forming apparatus 100) are defined in advance as activation patterns (step S106).

The activation timing information is briefly described below.

(Activation Timing Information)

FIG. 4 illustrates an example of data of activation timing information 71 according to an embodiment of the present invention. As shown in FIG. 4, data in the activation timing information 71 defines activation patterns. Specifically, each activation pattern is defined by a combination of data expressing the classification of the maximum usable power of the power supply unit 60 (maximum usable power classification); data expressing connection patterns of the devices 200 (connected device configuration); and data expressing a device configuration of devices that are installed in the image forming apparatus 100 for implementing basic functions (the scanning unit 16 (scanning system), the image forming unit 13 (image forming system), and the fixing unit 14). Data expressing activation timings (trigger information) is uniquely determined for each of these data combinations, and the data (trigger information) is associated with each activation pattern.

Notes on Indications in FIG. 4

In the activation timing information 71 shown in FIG. 4, "P₁" and "P₂" express the maximum usable power classification, where "P₂" indicates a classification corresponding to more power than that of "P₁".

In the connected device configuration data in FIG. 4, "x" indicates that the corresponding device 200 is not connected to the image forming apparatus 100. In the activation timing information 71 shown in FIG. 4, a maximum of three devices (device (1) 200₁ through device (3) 200₃) are connected as peripheral devices.

In the connected device configuration data in FIG. 4, "Δ" indicates that the corresponding device 200 does not have to be activated (does not have to perform an initialization operation) when returning from a power-saving mode. This means that when returning from a power-saving mode, the image forming apparatus 100 does not have to perform activation control on the corresponding device 200.

In the data in FIG. 4, "TRIGGER N" (N being a number) indicates the timing of activating the connected device 200 (timing of performing an initialization operation). In the activation timing information 71 shown in FIG. 4, four timings (TRIGGER 0 through TRIGGER 3) are defined as the activation timings. TRIGGER 0 indicates an activation timing that is earlier than that of TRIGGER 3 in terms of time-series. Each of TRIGGER 1 through TRIGGER 3 indicates an activation timing corresponding to a predetermined elapsed time from a time point (hereinafter, "reference point") acting as a reference for activation control. The reference point is determined by assigning the timing when the fixing unit 14 starts to reload (reload starting point), which is determined based on the amount of power allocated to the fixing unit 14 when the image forming apparatus 100 is activated.

In the data in FIG. 4, also for the information items of the scanning unit 16 (scanning system), the image forming unit 13 (image forming system), and the fixing unit 14, the activation timings are set in the same manner as that for the connected device configuration.

Types of Activation Patterns in FIG. 4

In the activation timing information 71 shown in FIG. 4, plural types of activation patterns are defined ("NORMAL", "TYPE A", "TYPE B", "TYPE C", and "TYPE D", as shown in FIG. 4) by the combinations of the above-described information items. Among these plural types of activation patterns, one activation pattern is specified based on information items acquired in steps S103 through S105.

Accordingly, the activation patterns can be classified according to device connection information (data A) indicating "the number of connected devices and connection patterns", startup method information (data B) indicating "power on/return from power-saving mode", and maximum usable power information (data C).

The activation timing information 71 having the above-described data configuration is stored in the non-volatile RAM 24.

Thus, the activation timing information 71 acquired in step S106 is loaded from the non-volatile RAM 24 to the RAM 23, and is temporarily saved in the RAM 23.

Accordingly, the CPU 21 refers to the activation timing information 71 acquired in step S106 based on the information items acquired in steps S103 through S105, to specify the appropriate activation pattern (determine one appropriate activation pattern to be used for activation control, from among the activation patterns in the activation timing information 71) (step S107: specifying unit).

Example of Specifying Activation Pattern in Activation Timing Information

For example, it is assumed that the information items acquired in steps S103 through S105 are "data A: the number of connected devices is three (device (1) $200_1$ through device (3) $200_3$)", "data B: return from power-saving mode", and "data C: classification of maximum usable power is $P_1$". Accordingly, when the CPU 21 refers to the activation timing information 71 shown in FIG. 4, two activation patterns of "TYPE D1" and "TYPE D2" can be found based on data A and data C.

Furthermore, the activation control is to be performed by "prioritizing low power consumption". Therefore, based on data B, "TYPE D2" is specified as the optimum activation pattern, in which the device (2) $200_2$ is defined as the device 200 that does not need to be activated when returning from the power-saving mode ("Δ" in FIG. 4).

In another example, it is assumed that the information items acquired in steps S103 through S105 are "data A: the number of connected devices is two (device (1) $200_1$ and device (3) $200_3$)" (where the device (3) $200_3$ is connected in such a manner so as not to affect the power allocation according to the connection pattern), "data B: power source ON", and "data C: classification of maximum usable power is $P_1$". Accordingly, when the CPU 21 refers to the activation timing information 71 shown in FIG. 4, two activation patterns of "TYPE C1" and "TYPE C2" can be found based on data A and data C.

Furthermore, the device (3) $200_3$ is connected in such a manner so as not to affect the power allocation. Therefore, based on data A, "TYPE C2" is specified as the optimum activation pattern, in which the activation timing ("TRIGGER 0" in FIG. 4) for the device (3) $200_3$ is defined to be relatively earlier than that in "TYPE C1".

As described above, based on at least one information item among the information items acquired in steps S103 through S105, the CPU 21 selects/determines the optimum activation pattern for performing activation control, in accordance with the devices 200 that are actually connected to the image forming apparatus 100. This activation pattern is selected from among the plural activation patterns in the activation timing information 71 that are defined in advance in consideration of control target devices such as the devices 200 connected to the image forming apparatus 100 and/or the devices installed in the image forming apparatus 100 (one pattern is specified from among plural activation patterns).

Next, in accordance with the specified activation pattern, the CPU 21 activates the devices 200 (step S108: activation control unit). The CPU 21 controls the activation by issuing control signals for instructing the devices 200 connected to the image forming apparatus 100 and/or the devices installed in the image forming apparatus 100 (the "scanning unit 16", the "image forming unit 13", and the "fixing unit 14") to start activating in accordance with the activation timings (TRIGGER 0 through TRIGGER 3) defined in association with the specified activation pattern. Details of the activation control performed at step S108 are described below in <Examples of operations>.

As described above, the image forming apparatus 100 according to the present embodiment first determines which activation control mode is to be applied to the activation control, i.e., either "prioritize time reduction" for reducing the activation time or "prioritize low power consumption" for reducing the power consumption for the activation.

When the image forming apparatus 100 determines to perform the activation control in the "prioritize low power consumption" mode, the image forming apparatus 100 acquires information such as connected device information (data indicating the number of connected devices and the connection pattern), startup method information (data indicating power on/return from power-saving mode), and maximum usable power information (data indicating power supply amount).

Next, based on the acquired information, the CPU 21 of the image forming apparatus 100 refers to the activation timing information 71 defining plural activation patterns, each activation pattern including a combination of activation timings for activating the devices 200. Among the plural activation patterns, the CPU 21 selects/determines the optimum activation pattern for performing activation control in the "prioritize low power consumption" mode, in accordance with the characteristics of the devices connected to the image forming apparatus 100 at the time of activation and the device configuration (including devices installed in the image forming apparatus 100), the method of starting up the image forming apparatus 100 (startup method of the image forming apparatus 100), and the power supply unit 60 provided in the image forming apparatus 100.

Thus, the CPU 21 controls the operations of activating the control target devices, such as the devices 200 connected to the image forming apparatus 100 and/or the devices installed in the image forming apparatus 100 (the "scanning unit 16", the "image forming unit 13", and the "fixing unit 14"), in accordance with the activation timings defined in the specified activation pattern.

<Examples of Operations>

A detailed description is given of activation control performed in accordance with an activation pattern, at steps S102 through S108 in the processing procedures described above.

In the following, activation control is described in terms of activation control modes, in the order of "prioritize time reduction" and "prioritize low power consumption".

((Prioritize Time Reduction))

FIG. 5 illustrates an example (part 1) of activating the devices 200 connected to the image forming apparatus 100 according to an embodiment of the present invention.

As shown in FIG. 5, three devices (device (1) $200_1$ through device (3) $200_3$) are connected to the image forming apparatus 100. Furthermore, the scanning unit 16, the image forming unit 13, and the fixing unit 14 are installed in the image forming apparatus 100. FIG. 5 illustrates how activation control is performed for the device (1) $200_1$ through device (3) $200_3$ and the scanning unit 16, the image forming unit 13, and the fixing unit 14. FIG. 5 also illustrates the power allocation (unit: %) allocated to the fixing unit 14. These conditions are also applicable to FIGS. 6 through 12, and are thus not further described.

In the "prioritize time reduction" mode, as shown in FIG. 5, first, the initialization process of the engine installed in the image forming apparatus 100 starts, and then the initialization process of the connected devices 200 starts.

Next, at the activation timing of "TRIGGER 0", the three devices (device (1) $200_1$ through device (3) $200_3$) and the scanning unit 16, the image forming unit 13, and the fixing unit 14 are activated at the same time. That is, all of the control target devices are activated simultaneously.

The power allocation allocated to the fixing unit 14 gradually increases starting from "TRIGGER 0", until the power allocation reaches 100%. This timing (when the power allocation reaches 100%) corresponds to when the fixing unit 14 starts to reload, i.e., when the temperature of a fixing roller (not shown) included in the fixing unit 14 starts to increase to a temperature at which the fixing operation can be performed (reload temperature). That is, this timing (when the power allocation reaches 100%) corresponds to the reference point used for the activation timings used in the activation control performed in the "prioritize low power consumption" mode.

In the "prioritize time reduction" mode, in order to minimize the time (activation time) required for activating all of the control target devices, the activation control is performed in accordance with an activation pattern in which the activation timings are defined such that all of the control target devices are activated at the same time.

((Case of "Prioritize Low Power Consumption" Mode))

In the description of the "prioritize low power consumption" mode, an operation performed in accordance with the activation patterns defined in the activation timing information 71 shown in FIG. 4, is taken as an example.

(TYPE D1)

Figure 6:
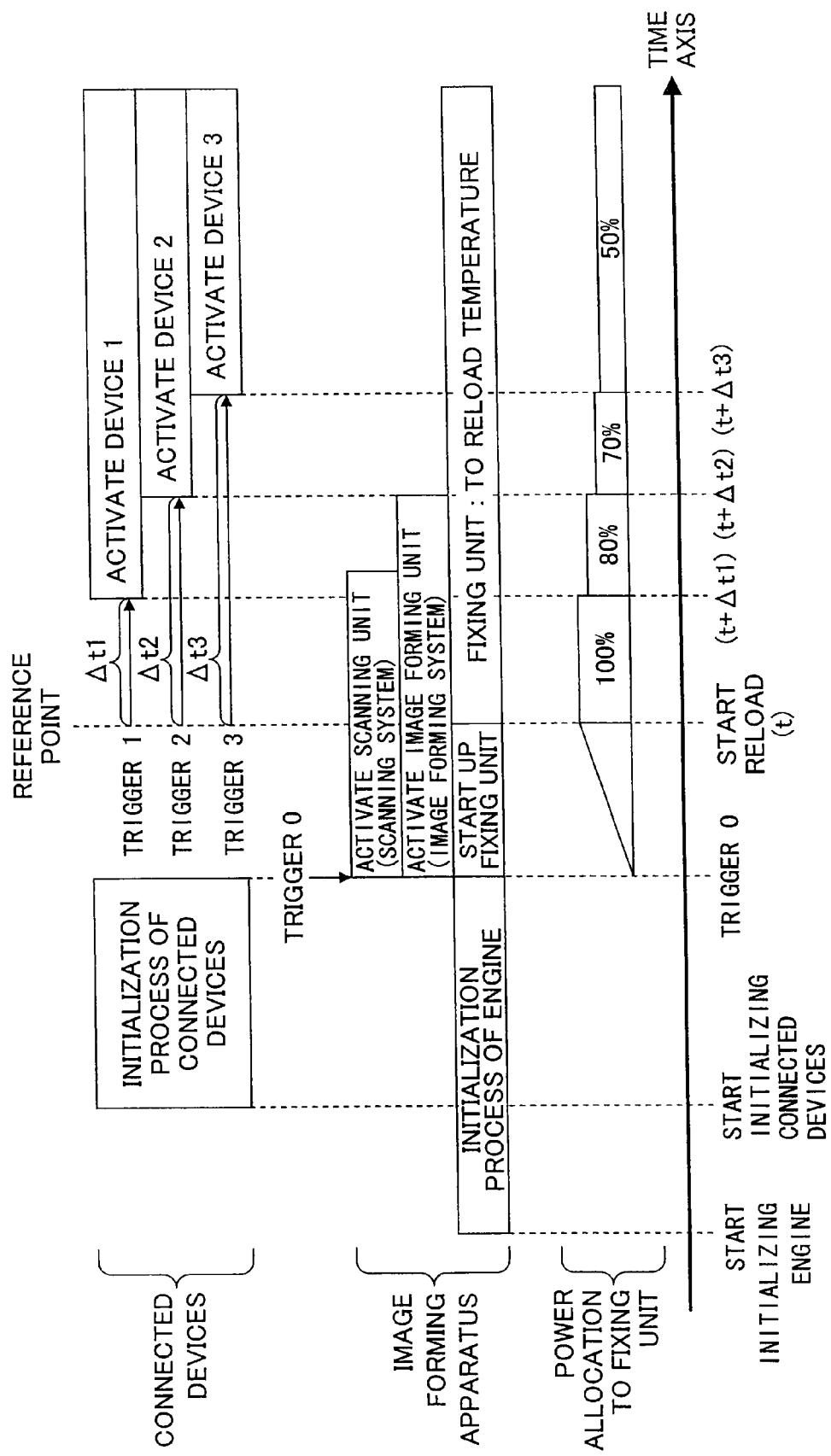
FIG. 6 illustrates an example (part 2) of activating the devices connected to the image forming apparatus according to an embodiment of the present invention.

FIG. 6 illustrates an example (part 2) of activating the devices 200 connected to the image forming apparatus 100 according to an embodiment of the present invention.

FIG. 6 illustrates an example where activation control is performed on the control target devices in accordance with the activation pattern "TYPE D1" defined in the activation timing information 71 shown in FIG. 4.

The activation pattern "TYPE D1" is used under the following conditions. That is, the activation pattern "TYPE D1" is specified based on the device connection information (data A), the startup method information (data B), and the maximum usable power information (data C) acquired in the above-described device activation process, whereby the information satisfies the following conditions.

(Condition 1) Three devices (device (1) $200_1$ through device (3) $200_3$) are connected (Condition 2) Image forming apparatus 100 is started up by turning ON the power supply (Condition 3) Classification of maximum usable power is "$P_1$"

When these conditions are satisfied, as shown in FIG. 6, the engine installed in the image forming apparatus 100 is initialized, and then connected devices 200 are initialized.

Next, at the activation timing of "TRIGGER 0", the scanning unit 16, the image forming unit 13, and the fixing unit 14 are activated. That is, among all the control target devices, only the devices installed in the image forming apparatus 100 are activated.

The power allocation allocated to the fixing unit 14 gradually increases starting from "TRIGGER 0", until the power allocation reaches 100%.

Activation of the device (1) $200_1$ through device (3) $200_3$ is controlled based on the reference point which corresponds to the reload starting point.

More specifically, the device (1) $200_1$ is activated at an activation timing (t+$\Delta$t1) of "TRIGGER 1", which is the timing when a predetermined time ($\Delta$t1) has elapsed from the reference point (reload starting point (t)). The device (2) $200_2$ is activated at an activation timing (t+$\Delta$t2) of "TRIGGER 2", which is the timing when a predetermined time ($\Delta$t2) has elapsed from the reference point (reload starting point (t)). The device (3) $200_3$ is activated at an activation timing (t+$\Delta$t3) of "TRIGGER 3", which is the timing when a predetermined time ($\Delta$t3) has elapsed from the reference point (reload starting point (t)).

The predetermined times ($\Delta$t1, $\Delta$t2, and $\Delta$t3) satisfy a relationship of ($\Delta$t1<$\Delta$t2<$\Delta$t3), and therefore the devices are activated at delayed timings, i.e., the devices are activated in the order of device (1) $200_1$, device (2) $200_2$, and device (3) $200_3$.

As described above, in the case of the "prioritize low power consumption" mode, activation control is performed on the control target devices so that the power consumption when the image forming apparatus 100 is activated is within the maximum usable power of the power supply unit 60.

Furthermore, the power allocation allocated to the fixing unit 14 is controlled in synchronization with the activation timings of "TRIGGER 1" at which the device (1) $200_1$ is activated, "TRIGGER 2" at which the device (2) $200_2$ is activated, and "TRIGGER 3" at which the device (3) $200_3$ is activated, after the reload starting point.

For example, as shown in FIG. 6, the allocation amount is 100% at the time point of the reload starting point (t), but the allocation amount is reduced to 80% (reduced by 20%) at the time point of "TRIGGER 1" (t+$\Delta$t1), considering that the device (1) $200_1$ has been activated.

Further, the allocation amount is reduced to 70% (reduced by 30%) at the time point of "TRIGGER 2" (t+$\Delta$t2), considering that the device (2) $200_2$ has been activated in addition to the device (1) $200_1$ (two devices). Further, the allocation amount is reduced to 50% (reduced by 50%) at the time point of "TRIGGER 3" (t+$\Delta$t3), considering that the device (1) $200_1$ through the device (3) $200_3$ have been activated (three devices).

In this manner, the power allocation allocated to the fixing unit 14, which consumes the largest amount of power among the control target devices, is controlled in accordance with the activated control target devices, thereby reducing the power consumption when the image forming apparatus 100 is activated.

In the present embodiment, as described with reference to the activation timing information 71, the CPU 21 verifies what the control target devices are (for example, the devices 200 connected to the image forming apparatus 100 and/or the devices installed in the image forming apparatus 100), and the activation timings of the control target devices are defined in advance as plural activation patterns. Accordingly, the power supplied to the fixing unit 14 (power allocation) can be controlled in accordance with the activation timings, to thereby achieve low power consumption. That is, the amount of power to be supplied to the fixing unit 14 at each activation timing is determined in advance, and therefore the power supplied to the fixing unit 14 can be controlled in accordance with the determined amounts of power.

(TYPE D2)

Figure 7:
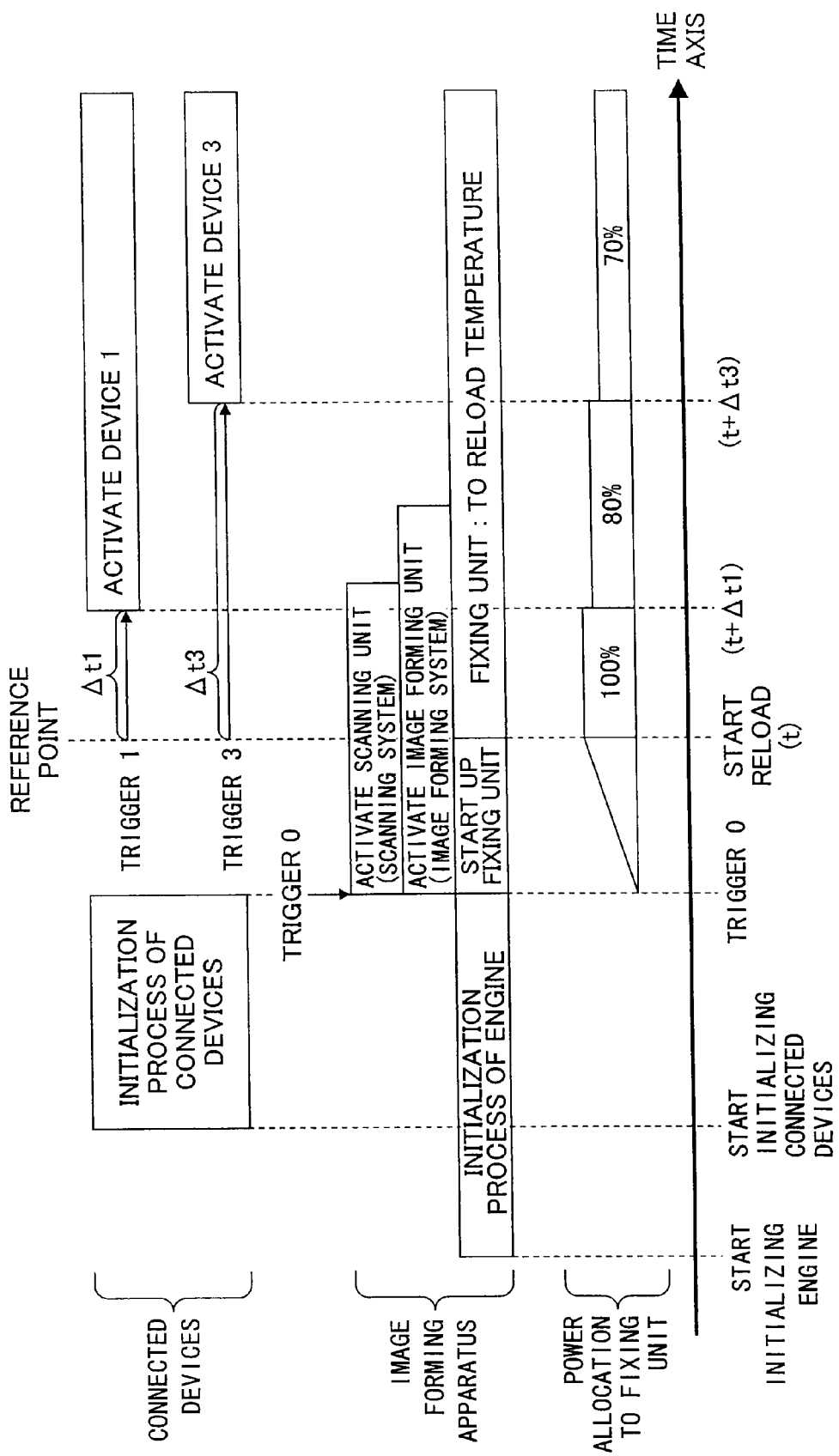
FIG. 7 illustrates an example (part 3) of activating the devices connected to the image forming apparatus according to an embodiment of the present invention.

FIG. 7 illustrates an example (part 3) of activating the devices 200 connected to the image forming apparatus 100 according to an embodiment of the present invention.

FIG. 7 illustrates an example where activation control is performed on the control target devices in accordance with the activation pattern "TYPE D2" defined in the activation timing information 71 shown in FIG. 4.

The activation pattern "TYPE D2" is used under the following conditions.

(Condition 1-1) Three devices (device (1) $200_1$ through device (3) $200_3$) are connected (Condition 1-2) Device (2) $200_2$ does not need to be activated when returning from power-saving mode (Condition 2) Image forming apparatus 100 is started up by returning from power-saving mode (Condition 3) Classification of maximum usable power is "$P_1$"

The difference between "TYPE D2" and "TYPE D1" is that "TYPE D2" is applied when the connected device (2) $200_2$ does not need to be activated when returning from power-saving mode, and the image forming apparatus 100 is started up by returning from power-saving mode, as indicated by (Condition 1-2) and (Condition 2).

Therefore, only the points that are different from the case of "TYPE D1" are described below, and the similar points are not further described.

The device (1) $200_1$ is activated at an activation timing (t+$\Delta$t1) of "TRIGGER 1", which is the timing when a predetermined time ($\Delta$t1) has elapsed from the reference point (reload starting point (t)). The device (3) $200_3$ is activated at an activation timing (t+$\Delta$t3) of "TRIGGER 3", which is the timing when a predetermined time ($\Delta$t3) has elapsed from the reference point (reload starting point (t)).

Meanwhile, the device (2) $200_2$ is not activated because the image forming apparatus 100 is started up by returning from a power-saving mode (Condition 2) and the device (2) $200_2$ is a control target device that does not need to be activated when returning from power-saving mode (Condition 1-2).

Accordingly, the power consumed for activating the device (2) $200_2$ can be reduced. Therefore, the power allocated to the fixing unit 14, which is controlled in accordance with the activation timings of the control target devices, is larger than that of the case of "TYPE D1" (more power is supplied).

As a result, the time required for the fixing unit 14 to reach the reload temperature can be reduced; the control target devices can be activated by using an amount of power that is within the maximum usable power of the power supply unit 60; and the standby time required for the image forming apparatus 100 to be ready for usage (time required for activation) can be reduced.

(TYPE B1)

Figure 8:
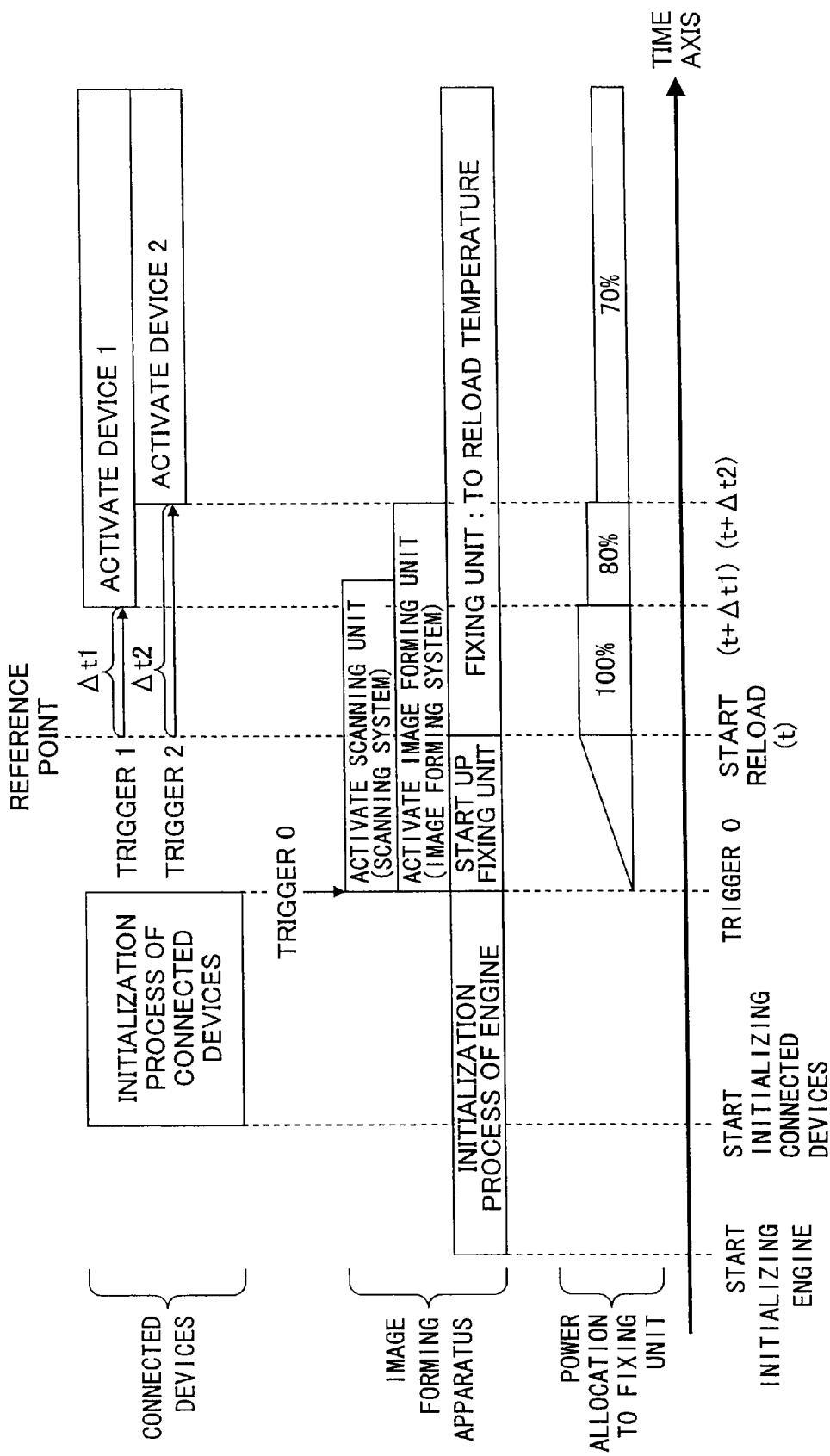
FIG. 8 illustrates an example (part 4) of activating the devices connected to the image forming apparatus according to an embodiment of the present invention.

FIG. 8 illustrates an example (part 4) of activating the devices 200 connected to the image forming apparatus 100 according to an embodiment of the present invention.

FIG. 8 illustrates an example where activation control is performed on the control target devices in accordance with the activation pattern "TYPE B1" defined in the activation timing information 71 shown in FIG. 4.

The activation pattern "TYPE B1" is used under the following conditions.

(Condition 1) Two devices (device (1) $200_1$ and device (2) $200_2$) are connected (Condition 2) Image forming apparatus 100 is started up by turning ON the power supply (Condition 3) Classification of maximum usable power is "$P_1$"

The difference between "TYPE B1" and "TYPE D1" is that "TYPE B1" is applied when two devices (device (1) $200_1$ and device (2) $200_2$) are connected to the image forming apparatus 100 as indicated by (Condition 1).

Therefore, only the points that are different from the case of "TYPE D1" are described below, and the similar points are not further described.

The device (1) $200_1$ is activated at an activation timing (t+$\Delta$t1) of "TRIGGER 1", which is the timing when a predetermined time ($\Delta$t1) has elapsed from the reference point (reload starting point (t)). The device (2) $200_2$ is activated at an activation timing (t+$\Delta$t2) of "TRIGGER 2", which is the timing when a predetermined time ($\Delta$t2) has elapsed from the reference point (reload starting point (t)).

Accordingly, the power consumed for activating one device (device (3) $200_3$) can be reduced, compared to the case where three devices are connected. Therefore, the power allocated to the fixing unit 14, which is controlled in accordance with the activation timings of the control target devices, is larger than that of the case of "TYPE D1" (more power is supplied). Thus, the same effects as "TYPE D2" can be achieved.

(TYPE C1)

Figure 9:
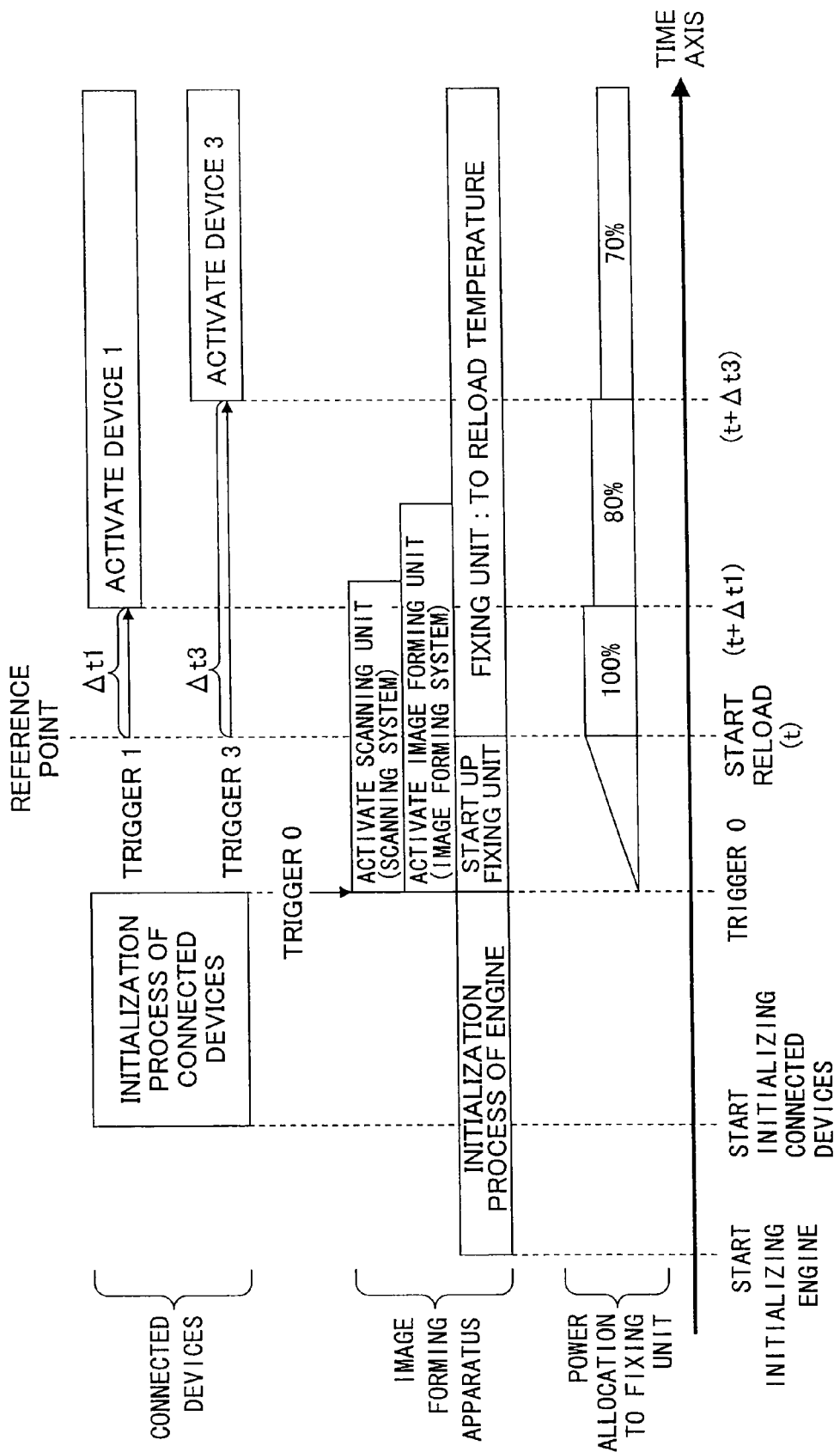
FIG. 9 illustrates an example (part 5) of activating the devices connected to the image forming apparatus according to an embodiment of the present invention.

FIG. 9 illustrates an example (part 5) of activating the devices 200 connected to the image forming apparatus 100 according to an embodiment of the present invention.

FIG. 9 illustrates an example where activation control is performed on the control target devices in accordance with the activation pattern "TYPE C1" defined in the activation timing information 71 shown in FIG. 4.

The activation pattern "TYPE C1" is used under the following conditions.

(Condition 1) Two devices (device (1) $200_1$ and device (3) $200_3$) are connected (Condition 2) Image forming apparatus 100 is started up by turning ON the power supply (Condition 3) Classification of maximum usable power is "$P_1$"

The difference between "TYPE C1" and "TYPE B1" is that "TYPE C1" is applied when the two devices of device (1) $200_1$ and device (3) $200_3$ are connected to the image forming apparatus 100 as indicated by (Condition 1).

Therefore, only the points that are different from the case of "TYPE B1" are described below, and the similar points are not further described.

The device (1) $200_1$ is activated at an activation timing (t+Δt1) of "TRIGGER 1", which is the timing when a predetermined time (Δt1) has elapsed from the reference point (reload starting point (t)). The device (3) $200_3$ is activated at an activation timing (t+Δt3) of "TRIGGER 3", which is the timing when a predetermined time (Δt3) has elapsed from the reference point (reload starting point (t)).

Thus, the same effects as "TYPE B1" can be achieved.

(TYPE B2)

Figure 10:
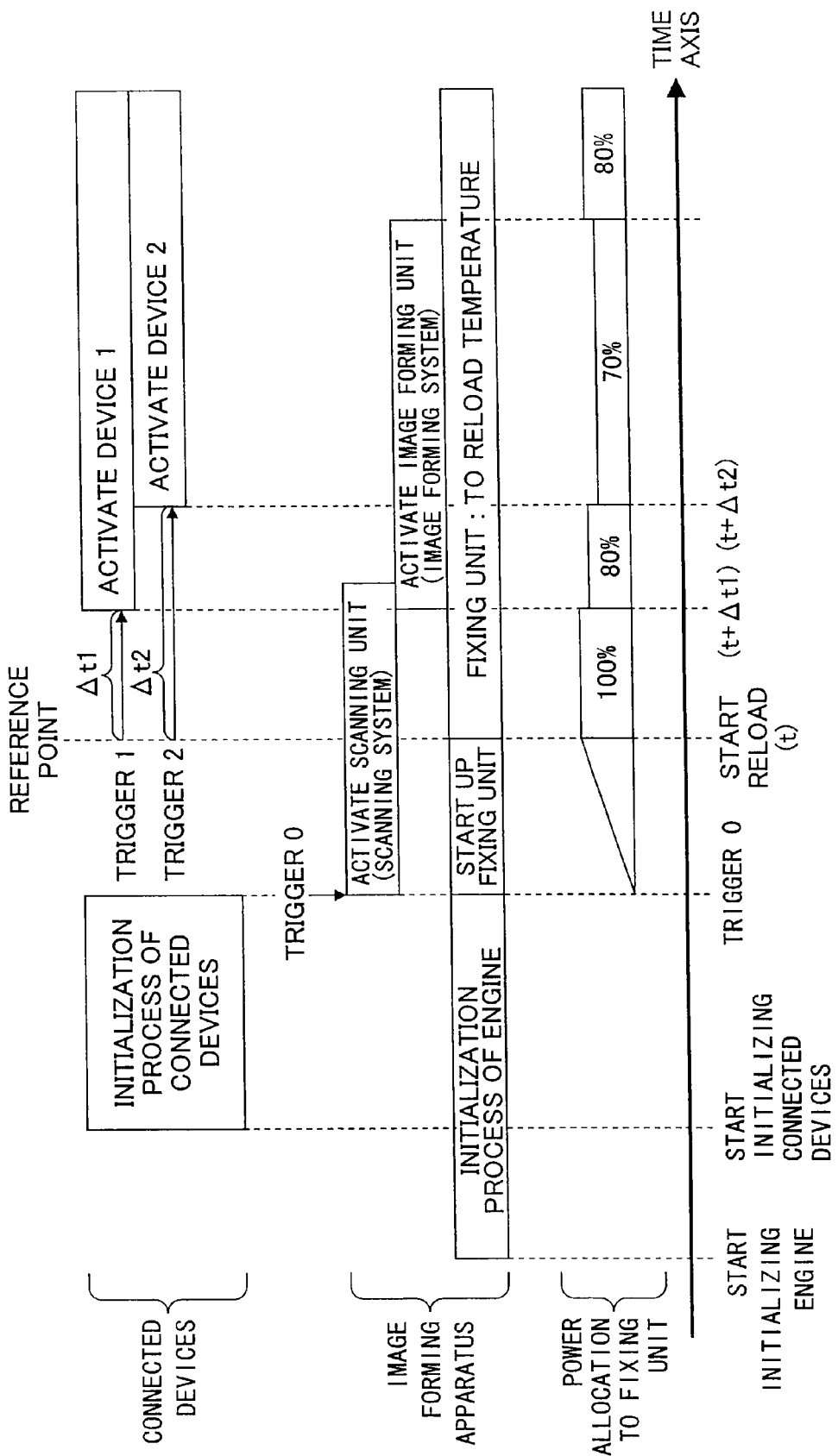
FIG. 10 illustrates an example (part 6) of activating the devices connected to the image forming apparatus according to an embodiment of the present invention.

FIG. 10 illustrates an example (part 6) of activating the devices 200 connected to the image forming apparatus 100 according to an embodiment of the present invention.

FIG. 10 illustrates an example where activation control is performed on the control target devices in accordance with the activation pattern "TYPE B2" defined in the activation timing information 71 shown in FIG. 4.

The activation pattern "TYPE B2" is used under the following conditions.

(Condition 1) Two devices (device (1) $200_1$ and device (2) $200_2$) are connected (Condition 2) Image forming apparatus 100 is started up by turning ON the power supply (Condition 3-1) Classification of maximum usable power is "$P_1$"

(Condition 3-2) Maximum usable power is low, within the classification of "$P_1$"

The difference between "TYPE B2" and "TYPE B1" is that "TYPE B2" is applied when the maximum usable power of the power supply unit 60 in the image forming apparatus 100 is low, within the classification of "$P_1$", as indicated by (Condition 3-2).

The maximum usable power of the power supply unit 60 may vary, even within the same classification.

"TYPE B2" is provided for such a case. "TYPE B2" is used for a case where the maximum usable power is low (tolerable power is low) compared to the case of "TYPE B1".

Therefore, only the points that are different from the case of "TYPE B1" are described below, and the similar points are not further described.

The scanning unit 16 is activated at the activation timing of "TRIGGER 0". Based on the limited amount of maximum usable power, and considering the power allocation to the fixing unit 14, activation of the image forming unit 13 is delayed by a predetermined amount of time.

More specifically, during the startup time of the fixing unit 14 (from "TRIGGER 0" to the reload starting point), only the scanning unit 16 is activated, so that power supply required for the fixing unit 14 can be secured.

As a result, the power allocation amount for the fixing unit 14 can be maintained at 100% until the activation timing (t+Δt1) of "TRIGGER 1" at which the device (1) $200_1$ is activated.

Subsequently, the image forming unit 13 is activated at the same time as when the device (1) $200_1$ is activated at the activation timing (t+Δt1).

In this manner, by delaying the activation timing of the image forming unit 13, the required amount of power can be supplied to the fixing unit 14. Therefore, even when the maximum usable power of the power supply unit 60 is low (tolerable power is low), the same effects as "TYPE B1" can be achieved.

Furthermore, the activation control can be performed in a detailed manner in accordance with the classification of the maximum usable power of the power supply unit 60 and the value of the maximum usable power of the power supply unit 60. Therefore, the power supply unit 60 provided in the image forming apparatus 100 can be changed without incurring difficulties. Thus, only the power supply unit 60 can be changed without the need of changing the devices other than the power supply unit 60. Accordingly, it is possible to provide a product having a power supply unit that conforms with the user's use applications and desired specifications.

(TYPE C2)

Figure 11:
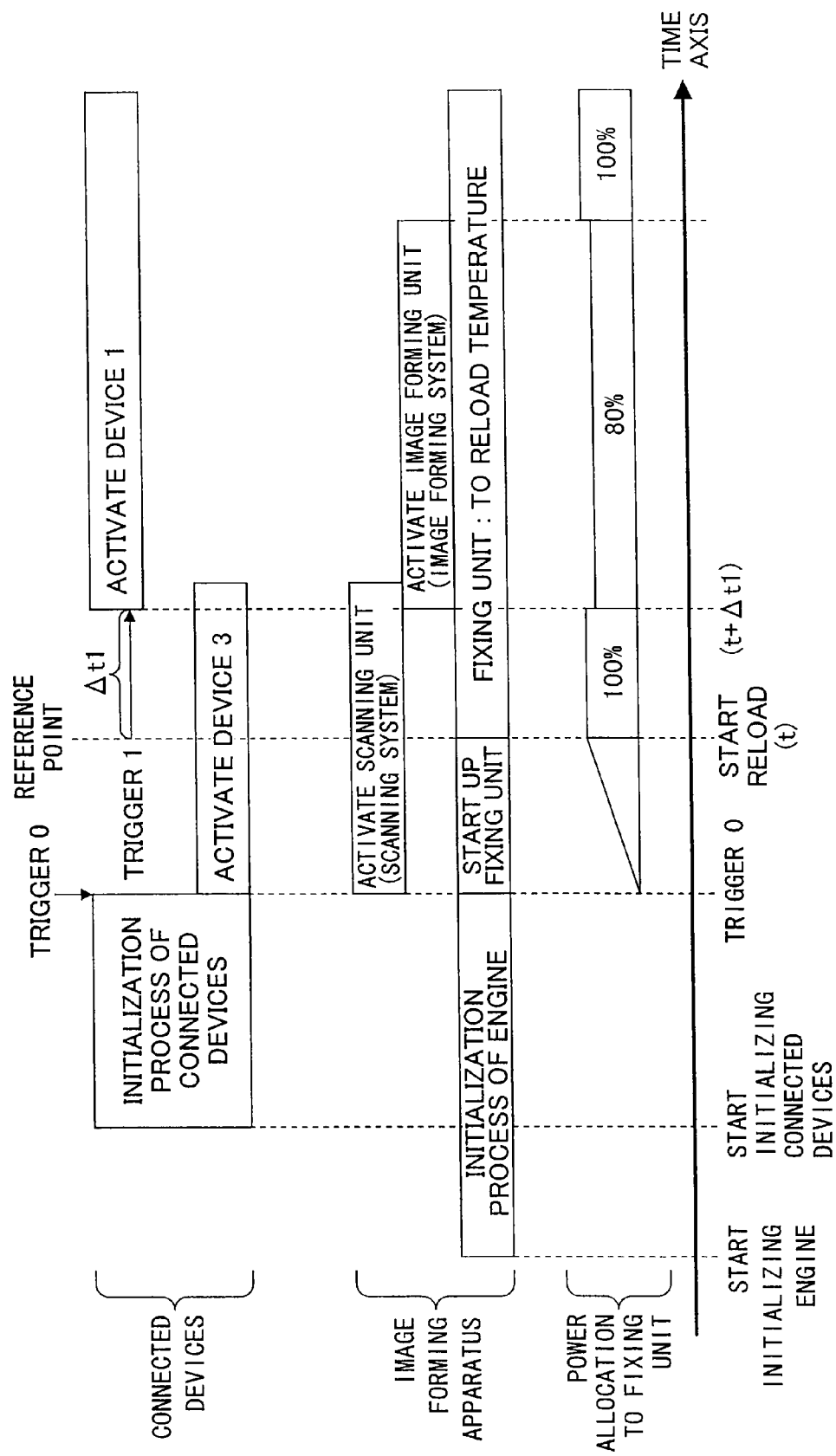
FIG. 11 illustrates an example (part 7) of activating the devices connected to the image forming apparatus according to an embodiment of the present invention.

FIG. 11 illustrates an example (part 7) of activating the devices 200 connected to the image forming apparatus 100 according to an embodiment of the present invention.

FIG. 11 illustrates an example where activation control is performed on the control target devices in accordance with the activation pattern "TYPE C2" defined in the activation timing information 71 shown in FIG. 4.

The activation pattern "TYPE C2" is used under the following conditions.

(Condition 1-1) Two devices (device (1) $200_1$ and device (3) $200_3$) are connected (Condition 1-2) Device (3) $200_3$ is connected by a connection pattern in such a manner so as not to affect the power allocation (Condition 2) Image forming apparatus 100 is started up by turning ON the power supply (Condition 3-1) Classification of maximum usable power is "$P_1$"

(Condition 3-2) Maximum usable power is low, within the classification of "$P_1$"

The difference between "TYPE C2" and "TYPE C1" is that "TYPE C2" is applied when the device (3) $200_3$ is connected to the image forming apparatus 100 by a connection pattern in such a manner so as not to affect the power allocation, and when the maximum usable power of the power supply unit 60 in the image forming apparatus 100 is low, within the classification of "$P_1$", as indicated by (Condition 1-2) and (Condition 3-2).

Therefore, only the points that are different from the case of "TYPE C1" are described below, and the similar points are not further described.

The scanning unit 16 and the device (3) $200_3$ are activated at an activation timing of "TRIGGER 0". Based on the limited amount of maximum usable power, and considering the power allocation to the fixing unit 14, activation of the image forming unit 13 is delayed by a predetermined amount of time.

More specifically, during the startup time of the fixing unit 14 (from "TRIGGER 0" to the reload starting point), only the scanning unit 16 and the device (3) $200_3$ are activated, so that power supply required for the fixing unit 14 can be secured.

As a result, the power allocation amount for the fixing unit 14 can be maintained at 100% until the activation timing (t+Δt1) of "TRIGGER 1" at which the device (1) $200_1$ is activated, because the device (3) $200_3$ does not to affect the power allocation to the fixing unit 14.

Subsequently, the image forming unit 13 is activated at the same time as when the device (1) $200_1$ is activated at the activation timing (t+Δt1).

In this manner, by delaying the activation timing of the image forming unit 13, the same effects as "TYPE B2" can be achieved. Furthermore, the control target device that does not affect the power allocation is activated at an early timing, so that the standby time required for the image forming apparatus 100 to be ready for usage (time required for activation) can be reduced.

(TYPE B3)

Figure 12:
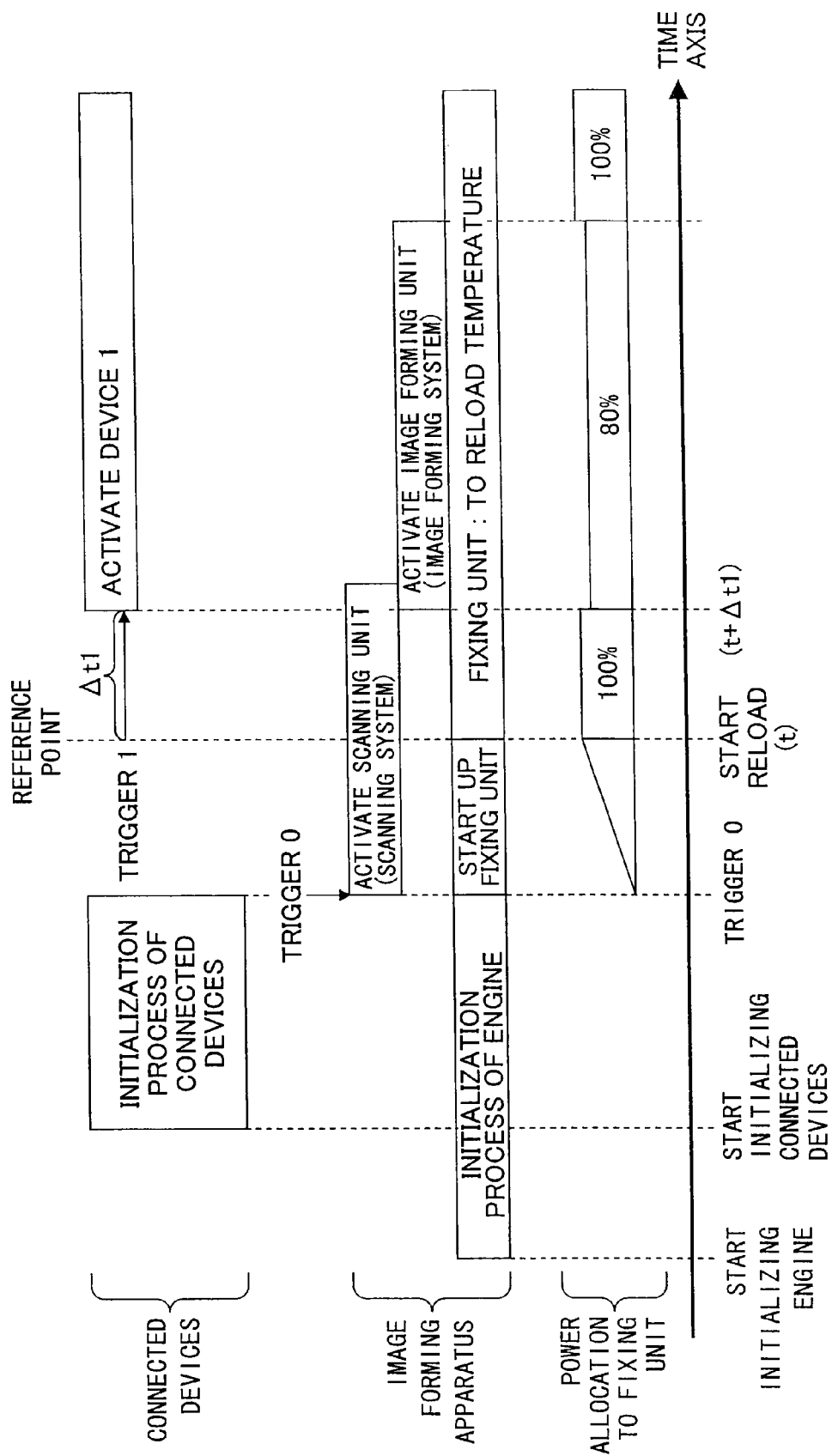
FIG. 12 illustrates an example (part 8) of activating the devices connected to the image forming apparatus according to an embodiment of the present invention.

FIG. 12 illustrates an example (part 8) of activating the devices 200 connected to the image forming apparatus 100 according to an embodiment of the present invention.

FIG. 12 illustrates an example where activation control is performed on the control target devices in accordance with the activation pattern "TYPE B3" defined in the activation timing information 71 shown in FIG. 4.

The activation pattern "TYPE B3" is used under the following conditions.

(Condition 1-1) Two devices (device (1) $200_1$ and device (2) $200_2$) are connected (Condition 1-2) Device (2) $200_2$ does not need to be activated when returning from power-saving mode (Condition 2) Image forming apparatus 100 is started up by returning from power-saving mode (Condition 3-1) Classification of maximum usable power is "$P_1$"

(Condition 3-2) Maximum usable power is low, within the classification of "$P_1$"

The difference between "TYPE B3" and "TYPE B2" is that "TYPE B3" is applied when the connected device (2) $200_2$ does not need to be activated when returning from power-saving mode, and the image forming apparatus 100 is started up by returning from the power-saving mode, as indicated by (Condition 1-2) and (Condition 2).

Therefore, only the points that are different from the case of "TYPE B2" are described below, and the similar points are not further described.

The device (1) $200_1$ is activated at an activation timing ($t+\Delta t1$) of "TRIGGER 1", which is the timing when a predetermined time ($\Delta t1$) has elapsed from the reference point (reload starting point (t)).

Meanwhile, the device (2) $200_2$ is not activated because the image forming apparatus 100 is started up by returning from a power-saving mode (Condition 2) and the device (2) $200_2$ is a control target device that does not need to be activated when returning from power-saving mode (Condition 1-2).

Accordingly, the power consumption required for activating the device (2) $200_2$ can be reduced. Therefore, the power allocated to the fixing unit 14, which is controlled in accordance with the activation timings of the control target devices, is larger than that of the case of "TYPE B2" (more power is supplied).

Thus, the same effects as "TYPE B2" can be achieved.

<Overview>

As described above, the image forming apparatus 100 according to an embodiment of the present invention first determines which activation control mode is to be applied to the activation control, i.e., either "prioritize time reduction" for reducing the activation time or "prioritize low power consumption" for reducing the power consumption for the activation.

When the image forming apparatus 100 determines to perform the activation control in the "prioritize low power consumption" mode, the image forming apparatus 100 acquires information such as connected device information (data indicating the number of connected devices and the connection pattern), startup method information (data indicating power on/return from power-saving mode), and maximum usable power information (data indicating power supply amount).

Next, based on the acquired information, the CPU 21 of the image forming apparatus 100 refers to the activation timing information 71 defining plural activation patterns, each activation pattern including a combination of activation timings for activating the devices 200. Among the plural activation patterns, the CPU 21 selects/determines the optimum activation pattern for performing activation control in the "prioritize low power consumption" mode, in accordance with the characteristics of the devices connected to the image forming apparatus 100 at the time of activation and the device configuration (including devices installed in the image forming apparatus 100), the startup method of the image forming apparatus 100, and the power supply unit 60 provided in the image forming apparatus 100.

Thus, the CPU 21 of the image forming apparatus 100 controls the operations of activating the control target devices, such as the devices 200 connected to the image forming apparatus 100 and/or the devices installed in the image forming apparatus 100 (the "scanning unit 16", the "image forming unit 13", and the "fixing unit 14"), in accordance with the activation timings defined in the specified activation pattern.

Specifically, the CPU 21 of the image forming apparatus 100 verifies what the control target devices are (for example, the devices 200 connected to the image forming apparatus 100 and/or the devices installed in the image forming apparatus 100). The CPU 21 specifies one optimum activation pattern from among plural activation patterns that have been defined (specified) in advance. The optimum activation pattern is specified based on information such as connected device information (data indicating the number of connected devices and the connection pattern), startup method information (data indicating power on/return from power-saving mode), and maximum usable power information (data indicating power supply amount).

Accordingly, the configuration of the power supply unit of the image forming apparatus 100 can be changed. Furthermore, the devices 200 connected to the image forming apparatus 100 and/or the devices installed in the image forming apparatus 100 can be activated by consuming the optimum amount of power and taking the optimum amount of activation time (time taken for activation). As a result, a stable operation environment can be provided for the user.

The "activation control function" of the image forming apparatus 100 in the above-described embodiment of the present invention may be implemented by causing a control device (for example, the CPU 21) to execute the processing procedures described with reference to the figures as a program that is coded with the use of a programming language conforming with the operation environment (platform). Accordingly, the program may be stored in a computer-readable recording medium (not shown).

By storing the program in a recording medium such as a floppy (registered trademark) disk, a compact disk (CD), and a digital versatile disk (DVD), the program can be installed in the image forming apparatus 100 via a drive device (not shown) capable of reading the recording medium. The image forming apparatus 100 includes an interface device (not shown), and therefore the program can be downloaded with the use of a telecommunication line such as the Internet.

In the above-described embodiment, the activation timing information 71 is stored in a predetermined storage area of the non-volatile RAM 24 included in the image forming apparatus 100; however, the present invention is not so limited. For example, the information can be stored in an external recording medium (for example, a detachably attached semiconductor memory). The information need not be stored in the storage device included in the image forming apparatus 100. The information may be stored anywhere as long as the information can be controlled by the functional units referring to this information.

In the above embodiment, the activation timing information 71 is described as being table data; however, the present invention is not limited to this data format.

The activation timing information 71 is to be configured such that the activation pattern is specified based on at least one information item out of the acquired information, i.e., the connected device information, the startup method information, and the maximum usable power information. That is, the activation timing information 71 may have any data configuration as long as the necessary information can be specified.

The present invention is not limited to the specifically disclosed embodiment, and variations and modifications may be made without departing from the scope of the present invention.

The present application is based on Japanese Priority Patent Application No. 2008-237124, filed on Sep. 16, 2008, the entire contents of which are hereby incorporated herein by reference.

What is claimed is:

1. An image forming apparatus for activating target devices comprising at least one of connected devices that are connected to the image forming apparatus and internal devices that are installed in the image forming apparatus, and for executing a requested process, the image forming apparatus comprising:
   an acquiring unit configured to acquire information comprising an information item pertaining to the connected devices, an information item pertaining to a startup method of the image forming apparatus, and an information item pertaining to maximum usable power of a power supply unit of the image forming apparatus;
   a specifying unit configured to verify what the target devices are and specify a corresponding activation pattern based on the information acquired by the acquiring unit, wherein the corresponding activation pattern is specified among plural activation patterns that have been set in advance, each of the plural activation patterns defining activation timings of the target devices; and
   an activation control unit configured to control activation of the target devices in accordance with the corresponding activation pattern specified by the specifying unit.

2. The image forming apparatus according to claim 1, wherein the specifying unit
   refers to definition information loaded in a storage device included in the image forming apparatus, wherein the definition information indicates the target devices that have been verified and the plural activation patterns that have been set in advance, each of the plural activation patterns defining the activation timings of the target devices; and
   specifies the corresponding activation pattern from the definition information, based on the information acquired by the acquiring unit.

3. The image forming apparatus according to claim 2, wherein the specifying unit specifies the corresponding activation pattern from the definition information, based on at least one of the information items included in the information acquired by the acquiring unit.

4. The image forming apparatus according to claim 3, wherein the specifying unit specifies the corresponding activation pattern from the definition information based on the information item pertaining to the connected devices acquired by the acquiring unit, wherein the information item pertaining to the connected devices indicates a number of the connected devices and a connection pattern of the connected devices.

5. The image forming apparatus according to claim 3, wherein the specifying unit specifies the corresponding activation pattern from the definition information based on the information item pertaining to the startup method acquired by the acquiring unit, wherein the information item pertaining to the startup method indicates whether the image forming apparatus is started up by turning on power of the image forming apparatus or by returning from a power-saving mode.

6. The image forming apparatus according to claim 3, wherein the specifying unit specifies the corresponding activation pattern from the definition information based on the information item pertaining to the maximum usable power acquired by the acquiring unit, wherein the information item pertaining to the maximum usable power indicates a value of the maximum usable power of the power supply unit.

7. The image forming apparatus according to claim 2, wherein the activation control unit controls the activation of the target devices in accordance with the activation timings of the target devices defined in the corresponding activation pattern specified by the specifying unit.

8. The image forming apparatus according to claim 1, further comprising:
   a setting unit configured to set, as an activation control mode, either a prioritize low power consumption mode for prioritizing low power consumption over reduced activation time when activating the target devices, or a prioritize time reduction mode for prioritizing reduced activation time over low power consumption when activating the target devices, wherein:
   the activation control unit controls the activation of the target devices based on the activation control mode set by the setting unit.

9. An activation control method performed by an image forming apparatus for activating target devices comprising at least one of connected devices that are connected to the image forming apparatus and internal devices that are installed in the image forming apparatus, and for executing a requested process, the activation control method comprising:
   an acquiring step of acquiring information comprising an information item pertaining to the connected devices, an information item pertaining to a startup method of the image forming apparatus, and an information item pertaining to maximum usable power of a power supply unit of the image forming apparatus;
   a specifying step of verifying what the target devices are and specifying a corresponding activation pattern based on the information acquired at the acquiring step, wherein the corresponding activation pattern is specified among plural activation patterns that have been set in advance, each of the plural activation patterns defining activation timings of the target devices; and
   an activation control step of controlling activation of the target devices in accordance with the corresponding activation pattern specified at the specifying step.

* * * * *